(12) United States Patent
Fredericks et al.

(10) Patent No.: US 11,361,281 B2
(45) Date of Patent: Jun. 14, 2022

(54) METHODS AND SYSTEMS FOR EXPENSE MANAGEMENT

(71) Applicant: Concur Technologies, Inc., Redmond, WA (US)

(72) Inventors: Michael Fredericks, Fairfax, VA (US); Joseph Dunnick, Baltimore, MD (US); Valery Gorodnichev, Vernon, IL (US); Jeannine Armstrong, Sea Cliff, NY (US)

(73) Assignee: SAP SE, Walldorf (DE)

( * ) Notice: Subject to any disclaimer, the term of this patent is extended or adjusted under 35 U.S.C. 154(b) by 219 days.

(21) Appl. No.: 16/728,838

(22) Filed: Dec. 27, 2019

(65) Prior Publication Data

US 2020/0219060 A1 Jul. 9, 2020

Related U.S. Application Data

(63) Continuation of application No. 15/671,770, filed on Aug. 8, 2017, now Pat. No. 10,565,558, which is a
(Continued)

(51) Int. Cl.
*G06Q 10/10* (2012.01)
*G06Q 20/10* (2012.01)
(Continued)

(52) U.S. Cl.
CPC ........... *G06Q 10/10* (2013.01); *G06Q 20/102* (2013.01); *G06Q 20/24* (2013.01); *G06Q 40/00* (2013.01); *G06Q 40/12* (2013.12)

(58) Field of Classification Search
CPC ........ G06Q 10/10; G06Q 40/00; G06Q 40/12; G06Q 20/24; G06Q 20/102; G06Q 20/10
(Continued)

(56) References Cited

U.S. PATENT DOCUMENTS 2,910,238 A 10/1959 Miles et al.
2,995,729 A 8/1961 Steele
(Continued)

FOREIGN PATENT DOCUMENTS

CN 101339700 1/2009
EP 0762306 A2 3/1997
(Continued)

OTHER PUBLICATIONS

"American Express Announces New Features in the latest Release of AXI(SM) at Corporate Travel World", PR Newswire, Mar. 2, 1998, p0302NYM159.
(Continued)

*Primary Examiner* — Andrew Joseph Rudy
(74) *Attorney, Agent, or Firm* — Fountainhead Law Group P.C.

(57) ABSTRACT

Methods and systems for expense management, comprising: retrieving at least one electronic feed of charges for multiple expense receipt records directly from at least one lodging and/or transportation vendor, the at least one feed of charges including computer-readable electronic transaction data; detecting that at least one expense receipt record from the multiple expense receipt records from the at least one feed of charges is comprised of two or more line items; mapping the two or more line items to at least one transportation and/or lodging good and/or service that is chargeable to at least one account identifier, the mapping utilizing vendor expense codes and/or keyword searches; and pre-populating the at least one transportation and/or lodging good and/or service mapped to each of the two or more line items from the at least one expense receipt record in at least one expense report in at least one expense management system as two or more expense itemizations.

20 Claims, 6 Drawing Sheets

Related U.S. Application Data continuation of application No. 13/117,303, filed on May 27, 2011, now Pat. No. 9,779,384, which is a continuation of application No. 11/159,398, filed on Jun. 23, 2005, now Pat. No. 7,974,892.

(60) Provisional application No. 60/581,766, filed on Jun. 23, 2004.

(51) Int. Cl.
  *G06Q 20/24* (2012.01)
  *G06Q 40/00* (2012.01)

(58) Field of Classification Search
  USPC .......................................................... 705/30
  See application file for complete search history.

(56) References Cited

U.S. PATENT DOCUMENTS

| | | | |
|---|---|---|---|
| 3,253,262 | A | 5/1966 | Wilenitz et al. |
| 4,049,276 | A | 9/1977 | Hole |
| 4,755,963 | A | 7/1988 | Denker et al. |
| 4,775,936 | A | 10/1988 | Junq |
| 4,845,625 | A | 7/1989 | Stannard |
| 4,857,840 | A | 8/1989 | Lanchais |
| 4,862,357 | A | 8/1989 | Ahlstrom et al. |
| 4,931,932 | A | 6/1990 | Dalnekoff et al. |
| 5,021,953 | A | 6/1991 | Webber et al. |
| 5,123,101 | A | 6/1992 | Sindhu |
| 5,148,365 | A | 9/1992 | Dembo |
| 5,191,523 | A | 3/1993 | Whitesage |
| 5,237,499 | A | 8/1993 | Garback |
| 5,253,165 | A | 10/1993 | Leiseca et al. |
| 5,253,166 | A | 10/1993 | Dettelbach et al. |
| 5,255,184 | A | 10/1993 | Hornick et al. |
| 5,270,921 | A | 12/1993 | Hornick et al. |
| 5,272,638 | A | 12/1993 | Martin et al. |
| 5,283,575 | A | 2/1994 | Kao et al. |
| 5,331,546 | A | 7/1994 | Webber et al. |
| 5,343,388 | A | 8/1994 | Wedelin |
| 5,402,336 | A | 3/1995 | SpieQelhoff et al. |
| 5,486,686 | A * | 1/1996 | Zdybel, Jr. ......... H04N 1/32133 711/3 |
| 5,500,513 | A | 3/1996 | Langhans et al. |
| 5,570,283 | A | 10/1996 | Shoolery et al. |
| 5,623,413 | A | 4/1997 | Matheson et al. |
| 5,644,721 | A | 7/1997 | Chung et al. |
| 5,648,900 | A | 7/1997 | Bowen et al. |
| 5,652,867 | A | 7/1997 | Barlow et al. |
| 5,739,512 | A | 4/1998 | Tognazzini |
| 5,802,492 | A | 9/1998 | DeLorme et al. |
| 5,802,511 | A | 9/1998 | Kouchi et al. |
| 5,832,451 | A | 11/1998 | Flake et al. |
| 5,832,452 | A | 11/1998 | Schneider et al. |
| 5,832,453 | A | 11/1998 | O'Brien |
| 5,832,454 | A | 11/1998 | Jafri et al. |
| 5,835,344 | A | 11/1998 | Alexander |
| 5,850,617 | A | 12/1998 | Libby |
| 5,897,620 | A | 4/1999 | Walker et al. |
| 5,899,981 | A | 5/1999 | Taylor et al. |
| 5,948,040 | A | 9/1999 | DeLorme et al. |
| 6,009,408 | A | 12/1999 | Buchanan |
| 6,023,679 | A | 2/2000 | Acebo et al. |
| 6,029,144 | A | 2/2000 | Barrett et al. |
| 6,085,169 | A | 7/2000 | Walker et al. |
| 6,115,680 | A | 9/2000 | Coffee et al. |
| 6,199,050 | B1 | 3/2001 | Alaia et al. |
| 6,275,808 | B1 | 8/2001 | DeMarcken |
| 6,295,521 | B1 | 9/2001 | DeMarcken et al. |
| 6,298,328 | B1 | 10/2001 | Healy et al. |
| 6,307,572 | B1 | 10/2001 | Demarcken et al. |
| 6,336,097 | B1 | 1/2002 | Scipioni |
| 6,360,205 | B1 | 3/2002 | Iyengar et al. |
| 6,377,932 | B1 | 4/2002 | DeMarcken |
| 6,381,578 | B1 | 4/2002 | DeMarcken |
| 6,434,533 | B1 | 8/2002 | FitzQerald |
| 6,442,526 | B1 | 8/2002 | Vance et al. |
| 6,446,048 | B1 | 9/2002 | Wells et al. |
| 6,473,740 | B2 | 10/2002 | Cockrill et al. |
| 6,493,695 | B1 | 12/2002 | Pickering et al. |
| 6,553,346 | B1 | 4/2003 | Walker et al. |
| 6,609,098 | B1 | 8/2003 | DeMarcken |
| 6,711,474 | B1 | 3/2004 | Treyz et al. |
| 6,801,226 | B1 | 10/2004 | Daughtrey |
| 6,826,473 | B1 * | 11/2004 | Burch .................... G01C 21/20 342/357.46 |
| 6,847,824 | B1 | 1/2005 | Contractor |
| 6,868,400 | B1 | 3/2005 | Sundaresan et al. |
| 7,050,986 | B1 | 5/2006 | Vance et al. |
| 7,103,558 | B1 | 9/2006 | Patton et al. |
| 7,158,980 | B2 | 1/2007 | Shen |
| 7,194,417 | B1 | 3/2007 | Jones |
| 7,249,041 | B2 | 7/2007 | Last |
| 7,263,664 | B1 | 8/2007 | Daughtrey |
| 7,277,923 | B2 | 10/2007 | Rensin et al. |
| 7,328,166 | B1 | 2/2008 | Geoqheqan et al. |
| 7,330,110 | B1 | 2/2008 | Heintzman et al. |
| 7,343,295 | B2 | 3/2008 | Pomerance |
| 7,349,894 | B2 | 3/2008 | Barth et al. |
| 7,366,682 | B1 | 4/2008 | Katiyar et al. |
| 7,395,231 | B2 | 7/2008 | Steury et al. |
| 7,409,643 | B2 | 8/2008 | Daughtrey |
| 7,457,764 | B1 * | 11/2008 | Bullock .................. G06Q 10/06 705/7.14 |
| 7,483,883 | B2 | 1/2009 | Barth et al. |
| 7,493,261 | B2 | 2/2009 | Chen et al. |
| 7,502,746 | B2 | 3/2009 | Bertram et al. |
| 7,516,089 | B1 | 4/2009 | Walker et al. |
| 7,539,620 | B2 | 5/2009 | Winterton et al. |
| 7,548,615 | B2 | 6/2009 | Bhalgat et al. |
| 7,555,387 | B2 | 6/2009 | Sladky et al. |
| 7,746,510 | B2 | 6/2010 | Pandipati |
| 7,949,579 | B2 | 5/2011 | Keld |
| 8,009,334 | B2 | 8/2011 | Pandipati |
| 8,036,978 | B1 | 10/2011 | Saavedra-Lim |
| 8,195,194 | B1 | 6/2012 | Tseng |
| 8,203,765 | B2 | 6/2012 | Pandipati |
| 8,224,830 | B2 | 7/2012 | Bidlack |
| 8,271,337 | B1 | 9/2012 | Norins |
| 8,373,912 | B2 | 2/2013 | Pandipati |
| 8,560,355 | B2 | 10/2013 | Adamson et al. |
| 8,600,784 | B1 | 12/2013 | Ivey et al. |
| 8,693,070 | B2 | 4/2014 | Pandipati |
| 8,706,580 | B2 | 4/2014 | Houseworth et al. |
| 8,766,795 | B1 | 7/2014 | Causey |
| 8,964,395 | B2 | 2/2015 | Pav et al. |
| 9,021,507 | B2 * | 4/2015 | Russo .................... G06F 9/543 719/328 |
| 9,569,757 | B1 | 2/2017 | Wilson et al. |
| 9,779,384 | B2 * | 10/2017 | Fredericks ............. G06Q 20/24 |
| 9,934,784 | B2 | 4/2018 | May et al. |
| 10,019,698 | B1 | 7/2018 | Scott et al. |
| 10,026,062 | B1 | 7/2018 | Sasmaz et al. |
| 10,068,225 | B2 | 9/2018 | Barrett |
| 10,210,569 | B1 | 2/2019 | Kim et al. |
| 10,289,991 | B1 | 5/2019 | Muller et al. |
| 10,289,992 | B1 | 5/2019 | Bell et al. |
| 10,313,383 | B2 | 6/2019 | Sommer et al. |
| 10,319,042 | B2 | 6/2019 | Arvapally et al. |
| 2001/0001856 | A1 | 5/2001 | Gould et al. |
| 2001/0042032 | A1 | 11/2001 | Crawshaw et al. |
| 2001/0051911 | A1 | 12/2001 | Marks et al. |
| 2001/0053999 | A1 | 12/2001 | Feinberg |
| 2002/0007327 | A1 | 1/2002 | Steury et al. |
| 2002/0026416 | A1 | 2/2002 | Provinse |
| 2002/0029176 | A1 | 3/2002 | Carlson et al. |
| 2002/0042715 | A1 | 4/2002 | Kelley |
| 2002/0065688 | A1 | 5/2002 | Charlton et al. |
| 2002/0069093 | A1 | 6/2002 | Stanfield |
| 2002/0077871 | A1 | 6/2002 | Udelhoven et al. |
| 2002/0095256 | A1 | 7/2002 | Jones et al. |
| 2002/0100803 | A1 | 8/2002 | Sehr |
| 2002/0120765 | A1 | 8/2002 | Boehmke |
| 2002/0124067 | A1 | 9/2002 | Parapudi et al. |

(56) References Cited

U.S. PATENT DOCUMENTS

| | | |
|---|---|---|
| 2002/0128971 A1 | 9/2002 | Narasimhan |
| 2002/0132627 A1 | 9/2002 | Ichihara et al. |
| 2002/0147619 A1 | 10/2002 | Floss et al. |
| 2002/0147678 A1 | 10/2002 | Drunsic |
| 2002/0152100 A1 | 10/2002 | Chen et al. |
| 2002/0152101 A1 | 10/2002 | Lawson et al. |
| 2002/0161610 A1 | 10/2002 | Walker et al. |
| 2002/0169509 A1 | 11/2002 | Huang et al. |
| 2002/0173978 A1 | 11/2002 | Boies et al. |
| 2003/0023463 A1 | 1/2003 | Dombroski et al. |
| 2003/0036918 A1 | 2/2003 | Pintsov |
| 2003/0040987 A1 | 2/2003 | Hudson et al. |
| 2003/0046195 A1 | 3/2003 | Mao |
| 2003/0065805 A1 | 4/2003 | Barnes, Jr. |
| 2003/0088487 A1 | 5/2003 | Cheng et al. |
| 2003/0115141 A1 | 6/2003 | Felix et al. |
| 2003/0120526 A1 | 6/2003 | Altman et al. |
| 2003/0141411 A1 | 7/2003 | Pandya |
| 2003/0171990 A1 | 9/2003 | Rao et al. |
| 2003/0176945 A1 | 9/2003 | Tzouka et al. |
| 2003/0187705 A1 | 10/2003 | Schiff |
| 2003/0225600 A1 | 12/2003 | Slivka et al. |
| 2004/0002876 A1 | 1/2004 | Sommers et al. |
| 2004/0044674 A1 | 3/2004 | Mohammadioun et al. |
| 2004/0083134 A1 | 4/2004 | Spero et al. |
| 2004/0128193 A1 | 7/2004 | Brice et al. |
| 2004/0148228 A1 | 7/2004 | Kwei |
| 2004/0167808 A1 | 8/2004 | Fredericks et al. |
| 2004/0193457 A1 | 9/2004 | Shogren |
| 2004/0198386 A1 | 10/2004 | Dupray |
| 2004/0210497 A1 | 10/2004 | Hirayama et al. |
| 2004/0210513 A1 | 10/2004 | Harford et al. |
| 2004/0215566 A1 | 10/2004 | Meurer |
| 2004/0243489 A1 | 12/2004 | Mitchell et al. |
| 2004/0267555 A1 | 12/2004 | Dale |
| 2005/0004830 A1 | 1/2005 | Rozell et al. |
| 2005/0015272 A1 | 1/2005 | Wind |
| 2005/0015295 A1 | 1/2005 | McCulloch |
| 2005/0027705 A1 | 2/2005 | Sadri et al. |
| 2005/0033616 A1 | 2/2005 | Vavul et al. |
| 2005/0033668 A1 | 2/2005 | Garcia et al. |
| 2005/0108068 A1 | 5/2005 | Marcken et al. |
| 2005/0108069 A1 | 5/2005 | Shiran et al. |
| 2005/0108117 A1 | 5/2005 | Newman |
| 2005/0131770 A1 | 6/2005 | Aqrawal |
| 2005/0165680 A1 | 7/2005 | Keeling et al. |
| 2005/0203760 A1 | 9/2005 | Gotumukkala et al. |
| 2005/0222854 A1 | 10/2005 | Dale et al. |
| 2005/0222944 A1 | 10/2005 | Dodson, Jr. et al. |
| 2005/0240601 A1 | 10/2005 | Lyons et al. |
| 2005/0251430 A1 | 11/2005 | Jindel |
| 2005/0267787 A1 | 12/2005 | Rose |
| 2005/0288973 A1 | 12/2005 | Taylor et al. |
| 2005/0288976 A1 | 12/2005 | Abrams et al. |
| 2006/0046740 A1 | 3/2006 | Johnson |
| 2006/0053053 A1 | 3/2006 | Baggett |
| 2006/0069504 A1 | 3/2006 | Bradley et al. |
| 2006/0069592 A1 | 3/2006 | Di Florio et al. |
| 2006/0080126 A1 | 4/2006 | Greer et al. |
| 2006/0089907 A1 | 4/2006 | Kohlmaier et al. |
| 2006/0106655 A1 | 5/2006 | Lettovsky et al. |
| 2006/0167834 A1 | 7/2006 | Rubel, Jr. |
| 2006/0206363 A1 | 9/2006 | Gove |
| 2006/0206506 A1 | 9/2006 | Fitzpatrick |
| 2006/0212321 A1 | 9/2006 | Vance et al. |
| 2006/0241909 A1 | 10/2006 | Morgan et al. |
| 2006/0241983 A1 | 10/2006 | Viale et al. |
| 2006/0247993 A1 | 11/2006 | Scanlan et al. |
| 2006/0277079 A1 | 12/2006 | Gilligan et al. |
| 2006/0287880 A1 | 12/2006 | Fitzgerald et al. |
| 2006/0293931 A1 | 12/2006 | Fitzgerald et al. |
| 2007/0021909 A1 | 1/2007 | Matsuda |
| 2007/0067193 A1 | 3/2007 | Robertson |
| 2007/0073562 A1 | 3/2007 | Brice et al. |
| 2007/0083401 A1 | 4/2007 | Vogel et al. |
| 2007/0094056 A1 | 4/2007 | Kang et al. |
| 2007/0143155 A1 | 6/2007 | Whitsett et al. |
| 2007/0179863 A1 | 8/2007 | Stoll |
| 2007/0250357 A1 | 10/2007 | Steury et al. |
| 2008/0052217 A1 | 2/2008 | Etkin |
| 2008/0072067 A1 | 3/2008 | Koretz |
| 2008/0077324 A1 | 3/2008 | Hatano et al. |
| 2008/0082373 A1 | 4/2008 | Durocher et al. |
| 2008/0086455 A1 | 4/2008 | Meisels et al. |
| 2008/0091482 A1 | 4/2008 | Whitsett et al. |
| 2008/0097873 A1 | 4/2008 | Cohen et al. |
| 2008/0114807 A1 | 5/2008 | Sembower et al. |
| 2008/0126143 A1 | 5/2008 | Altman et al. |
| 2008/0154876 A1 | 6/2008 | Hao |
| 2008/0167887 A1 | 7/2008 | Marcken |
| 2008/0189148 A1 | 8/2008 | Diaz et al. |
| 2008/0198761 A1 | 8/2008 | Murawski |
| 2008/0215406 A1 | 9/2008 | Pachon et al. |
| 2008/0221936 A1 | 9/2008 | Patterson |
| 2008/0262878 A1 | 10/2008 | Webby |
| 2008/0270224 A1 | 10/2008 | Portman et al. |
| 2008/0319808 A1 | 12/2008 | Wofford et al. |
| 2009/0006143 A1 | 1/2009 | Orttung et al. |
| 2009/0012824 A1 | 1/2009 | Brockway et al. |
| 2009/0063208 A1 | 3/2009 | Stirlen et al. |
| 2009/0088971 A1 | 4/2009 | Currie et al. |
| 2009/0099965 A1 | 4/2009 | Grant |
| 2009/0125321 A1 | 5/2009 | Charlebois et al. |
| 2009/0157292 A1 | 6/2009 | Currie et al. |
| 2009/0157513 A1 | 6/2009 | Bonev et al. |
| 2009/0187449 A1 | 7/2009 | Van Tulder et al. |
| 2009/0210262 A1 | 8/2009 | Rines |
| 2009/0216746 A1 | 8/2009 | Aubin et al. |
| 2009/0234818 A1 | 9/2009 | Lobo et al. |
| 2009/0271302 A1 | 10/2009 | Hamper |
| 2010/0017316 A1 | 1/2010 | Joseph et al. |
| 2010/0045705 A1 | 2/2010 | Vertegaal |
| 2010/0057502 A1 | 3/2010 | Arguelles et al. |
| 2010/0057503 A1 | 3/2010 | Katz |
| 2010/0087977 A1 | 4/2010 | Bonne |
| 2010/0094878 A1 | 4/2010 | Soroca et al. |
| 2010/0121660 A1 | 5/2010 | Boykin |
| 2010/0161432 A1 | 6/2010 | Kumanov et al. |
| 2010/0175001 A1 | 7/2010 | Lazarus et al. |
| 2010/0191550 A1 | 7/2010 | Hutson |
| 2010/0198680 A1 | 8/2010 | Ma et al. |
| 2010/0203868 A1 | 8/2010 | Sagie et al. |
| 2010/0228628 A1 | 9/2010 | Dufour |
| 2010/0235085 A1 | 9/2010 | Kikuchi |
| 2010/0257195 A1 | 10/2010 | Inoue et al. |
| 2010/0069093 A1 | 11/2010 | Carlson et al. |
| 2010/0302056 A1 | 12/2010 | Dutton et al. |
| 2010/0305984 A1 | 12/2010 | Ben-Yitschak |
| 2011/0022405 A1 | 1/2011 | Heinz et al. |
| 2011/0029413 A1 | 2/2011 | Ben-Tzur et al. |
| 2011/0045801 A1 | 2/2011 | Parker, II |
| 2011/0060480 A1 | 3/2011 | Mattia |
| 2011/0071886 A1 | 3/2011 | Schnur et al. |
| 2011/0087688 A1 | 4/2011 | Midtun et al. |
| 2011/0137768 A1 | 6/2011 | Onishi et al. |
| 2011/0144898 A1 | 6/2011 | Koniq |
| 2011/0225257 A1 | 9/2011 | Tilden et al. |
| 2011/0246246 A1 | 10/2011 | Johnson |
| 2011/0258005 A1 | 10/2011 | Fredericks et al. |
| 2011/0270715 A1 | 11/2011 | Moorhead |
| 2011/0282964 A1 | 11/2011 | Krishnaswmy |
| 2011/0288768 A1 | 11/2011 | Stefani et al. |
| 2011/0307280 A1 | 12/2011 | Mandelbaum |
| 2011/0313883 A1 | 12/2011 | Angeline et al. |
| 2012/0046049 A1 | 2/2012 | Curtis |
| 2012/0101901 A1 | 4/2012 | DePasquale |
| 2012/0157795 A1 | 6/2012 | Chiu et al. |
| 2012/0185368 A1 | 7/2012 | Schlater et al. |
| 2012/0209640 A1 | 8/2012 | Hamper |
| 2012/0218127 A1 | 8/2012 | Kroen et al. |
| 2012/0239290 A1 | 9/2012 | Fujita |
| 2012/0281584 A1 | 11/2012 | Powers |
| 2012/0321281 A1 | 12/2012 | Hilem |
| 2012/0330693 A1 | 12/2012 | Ciabrini et al. |

(56) References Cited

U.S. PATENT DOCUMENTS

| | | |
|---|---|---|
| 2012/0330906 A1 | 12/2012 | Fredericks et al. |
| 2013/0006777 A1 | 1/2013 | Krishnareddy et al. |
| 2013/0041696 A1 | 2/2013 | Richard |
| 2013/0080053 A1 | 3/2013 | Rakshit |
| 2013/0090966 A1 | 4/2013 | Rivere |
| 2013/0166607 A1 | 6/2013 | Turk et al. |
| 2013/0268878 A1 | 10/2013 | Le Roux et al. |
| 2013/0329943 A1 | 12/2013 | Christopulos et al. |
| 2014/0052714 A1 | 2/2014 | Brodziak et al. |
| 2014/0350972 A1 | 11/2014 | Haywood et al. |

FOREIGN PATENT DOCUMENTS

| | | |
|---|---|---|
| WO | 200002152 | 1/2000 |
| WO | 200161607 | 8/2001 |

OTHER PUBLICATIONS

"Geico Information", Business Wire, Mar. 17, 1998.

"Thread: Pay Per Impression Programs", Digital Point Forums, Mar. 2005, found online at forums.digitalpoint.com/showthread.php?t=12248.

"Suppliers Work On Ancillary Air Fee Reporting" McNulty Business Travel News 43-46, Apr. 1992 (Oct. 22, 2009).

Amir A. Sadrian et al., "A Procurement Decision Support System in Business Volume Discount Environments", Operations Research, vol. 42, No. 1, pp. 14-23, Jan.-Feb. 1994.

Amir A. Sadrian et al., "Business Volume Discount: A New Perspective on Discount Pricing Strategy", The National Association of Purchasing Management, Inc., pp. 43-46, Apr. 1992.

Bruce Schumacher, "Proactive Flights Schedule Evaluation at Delta Air Lines", Proceedings of the 1999 Winter Simulation Conference, pp. 1232-1237 (1999).

D. Bartholomew, "Cleared for Takeoff", InformationWeek, pp. 55, Mar. 1993.

David A. Shepherd, "A Slam Model of Domestic Airline Passenger Fares and the Contract Air Service Program", Air Force Inst. of Tech., Wright-Patterson AFG, OH. School of Systems and Logistics, Sep. 1986 (136 pages).

David Eisen, "Setting Up a Hotel Program", Business Travel News, vol. 23, No. 7, pp. 58(8) Apr. 24, 2006.

Edward P. Gilligan, "Trimming Your T&E is Easier Than You Think", Managing Office Technoloav, vol. 40, No. 11, pp. 39-40, Nov. 1995.

Eric K. Clemons et al., "Ahead of the Pack Through Vision and Hustle: A Case Study of Information Technology at Rosenbluth Travel", IEEE, pp. 287-296 (1991).

Gary Stoller, "For Travel Companies, the slower the website, the smaller the potential profit", dated Jun. 1, 2011.

Gerard Francois, "Socrate: Un Projet Strategique de al SNCF au Services des Voyageures", Revue Generale Des Chemins De Fer, Suppl. No 6, pp. 7-9, Jun. 1990.

Hasan Pirkul et al., "Capacitated Multiple Item Ordering Problem with Quantity Discounts", IIE Transactions, vol. 17, No. 3, pp. 206-211, Sep. 1985.

Jacques A. Ferland et al., "Computer Aided Scheduling for a Sport League", Infor., vol. 29, No. 1, pp. 14-25, Feb. 1991.

James C. Bean et al., "Reducing Travelling Costs and Player Fatigue in the National Basketball Association", Interfaces, vol. 10, No. 3, pp. 98-102, Jun. 1980.

James V. Jucker et al., "Single-Period Inventory Models with Demand Uncertainty and Quantity Discounts: Behavioral Implications and a New Solution Procedure", Naval Research Logistics Quarterly, vol. 32, pp. 537-550 (1985).

Charles, "GPS is Smartening Up Your Cell Phone", NPR, Sep. 25, 2006, 4 pages.

Jeffrey L. Huisingh et al., "OffSite: Federal Employee Training Site Selection Software", US Army Tradoc Analysis Center-Monterey Technical Report No. 98-02.

Joseph Kornick, "Firm's new system tracks, refunds unused e-tickets" Travel Weekly, May 20, 1999.

Juile Barker, "Keeping Control When Hotel Costs Soar", Successful Meetings, vol. 47, No. 3, pp. 31, Mar. 1998.

Mal Gormley, "NBAA's Travel$ense", Business and Commercial Aviation, vol. 79, No. 2, pp. 60, Aug. 29, 1996.

Matthew E. Berge et al., "Demand Drive Dispatch: A method for Dynamic Aircraft Capacity Assignment, Models and Algorithms", Operations Research, vol. 41, No. 153-168, Jan.-Feb. 1993.

Nancy Trejos, "Travelers have no patiende for slow mobile websites", dated May 6, 2012, http://www.usatoday.com/USCP/PNI/Features/2012-05-06-PNI0506tra-website-speedART_ST_U.thm.

Paul Katz et al., "Making the Most of a Telephone Company's Purchasing Power", Belcore Exchange, pp. 23-27, Mar./Apr. 1990.

Paul Katz et al., "Telephone Companies Analyze Price Quotations with Bellcore's POSS Software", Interfaces 24, pp. 50-63, Jan. 1-Feb. 1994.

PR Newswire, Concur Technologies Launches Concur Expense 7.0, Jul. 24, 2003, p. 1.

R.A. Russell, "Scheduling the Texas League with Multiple Objectives", 1994 Proceedings Decisions Sciences Institute, pp. 1248-1250, 1994.

Ram Narasimhan et al., "Optimizing Aggregate Procurement Allocation Decisions", Journal of Purchasing and Materials Management, pp. 23-30, May 1986.

Robert A. Russell et al., "Devising a Cost Effective Schedule for a Baseball League", Operations Research, vol. 42, No. 4, pp. 614-625, Jul.-Aug. 1994.

Robert J. Dolan, "Quantity Discounts: Managerial Issues and Research Opportunities", Marketing Science, vol. 6, No. 1, pp. 1-24, Winter 1987.

Tripit, "Flight Duplicates: Conflict Resolved", Sep. 13, 2010, Concur, 3 pages.

Www.concur.com, from Web Archive, http:/Jweb.archive.org/web/20000622043004/ http://www.concur.com/, archived Jun. 22, 2000, printed Jan. 6, 2014.

Www.outtask.com, from Web Archive, http: /web.arch ive.org/web/20001009025559/http://www.outtask.com/, archived Oct. 9, 2000, printed Jan. 6, 2014.

Z. Drezner et al., "Theory and Methodology: Multi-buyer discount pricing", European Journal of Operational Research, vol. 40, pp. 38-42 (1989).

\* cited by examiner

| | Outtask Vinnet – Microsoft Internet Explorer | | | | | ☐ ☐ ✕ |
|---|---|---|---|---|---|---|
| Vinnet Menu Reports | Save | Submit | Print | Help | Online | |

Expense Details | Exceptions | Import | Report Settings | Report Summary Hotel Folio Import (04/29/2005 – 05/06/2005)

📋 Trips Needing Expense Reports

You have no trips to import.

📋 Outstanding Corporate Credit Charges

| | Description | Date | Amount | Int'l Amount | Status |
|---|---|---|---|---|---|
| ☐ | HOLIDAY INN CHICAGO | 05/22/2005 | $768.00 | | |
| ☐ | HILTON | 05/27/2005 | $674.45 | | |
| ☐ | HERTZ RENT A CAR | 05/28/2005 | $62.35 | | |
| ☐ | UNITED AIR DEVNER CO | 05/28/2005 | $2112.00 | | |
| ☐ | EXXON CO. USA CHARLOTTE | 05/29/2005 | $18.47 | | |
| ☐ | MACARONI #M148 IRVINE | 05/29/2005 | $9.02 | €7.47 | |
| ☐ | RED LOBSTER 129001 | 05/29/2005 | $19.95 | | |
| ☐ | CARVEL BAKERY | 05/29/2005 | $45.00 | | |
| ☐ | BEST BUY 00005157 | 05/30/2005 | $52.89 | | |
| ☐ | BELL ATLANTIC MOBILEFEAST | 05/30/2005 | $3.78 | | |
| ☐ | OFFICE DEPOT #1214 | 05/30/2005 | $300.42 | | |
| ☐ | CDW COMPUTER CENTERS | 05/30/2005 | $600.42 | | |
| ☐ | STAPLES OFFICE SUPPLIES | 05/30/2005 | $79.57 | | |

☐ ✓ Mark All Charges          [Import] [✕ Remove] [Find Matches]

Expense List    + Add new Expense    Total $ Items $0.00    ⓘ    Total Due Employee $0.00

| Type | Date | Itinerary | Amount | Pay Method | Details |
|---|---|---|---|---|---|

Done                                                                 Local intranet

Expense Type

Personal

ID

8000

Description

Personal

General Ledger

00

Forced Payment Method

None

Detail Form

Personal

None

☐ Project Required

Minimum amount for receipt required:   ● Use default Value of $0.01
　　　　　　　　　　　　　　　　　　　　○ Use Custom Value

Require Paper Receipt even if e-receipt present:   No

"Help Text" shown when adding this expense (HTML Client Only):

Semantic Properties
　　　Check the box(es) that help define this expense if any are applicable
Hotel Portfolio Import

☐ Audio / Visual
☐ Banquet Facilities
☐ Business Center (copies, faxes, etc.)
☐ Cash Advance/Disbursement
☐ Conference Room
☐ Early Departure Charges
☑ Gift Shop
☐ Gratuities/Tips
☐ Health Club
☐ Internet Access
☐ Laundry/Dry Cleaning
☐ Lounge Bar
☑ Mini-bar
☑ Movies
☐ Restaurant
☐ Room Service
☐ Telephone
☐ Transportation (e.g. Hotel Limousine)
☐ Valet Parking

FIGURE 6

| | | | | | |
|---|---|---|---|---|---|
| Outtask Vinnel – Microsoft Internet Explorer | | | | | □ ◻ ✕ |

Vinnet  Menu  Reports    Save   Submit   Print   Help    Online

| Expense Details | Exceptions | Import | Report Settings | Report Summary |

Editing Expense            Hotel Folio Import (04/29/2005 – 05/06/2005)

Expense Type: ☏ Telephone/Fax ▽
Date: 05/25/20005
Amount Spent: 3.21   $ - (USD) ▽
Pay Method:

Itinerary: Test
Portfolio: Portfolio - $ 674.45 – 05/27/2005 ▽

Cost Center: Research and Development (11)
Project:
Location: ▽

Task:
Award:

Commetns:
Telephone-LD (INTERSTATE)

Apply Charges   Cancel   Split   Duplicate

Expense List    + Add new Expense    Total $ Items $ 674.45 ▽    Total Due Employee $0.00

| | Type | Date | Itinerary | Amount | Pay Method | Details |
|---|---|---|---|---|---|---|
| ✎ ✕ | ▼ Portfolio | 05/27/2005 | Test | $ 674.45 | MC 2 | |
| ✎ ✕ | Hotel | 05/25/2005 | Test | $ 353.28 | MC 2 | ▽ |
| ✎ ✕ | ☏ Telephone/Fax | 05/25/2005 | Test | $ 3.21 | MC 2 | |
| ✎ ✕ | Hotel | 05/26/2005 | Test | $ 289.06 | MC 2 | ▽ |
| ✎ ✕ | Meals | 05/27/2005 | Test | $ 22.45 | MC 2 | |
| ✎ ✕ | ☏ Telepone/Fax | 05/27/2005 | Test | $1.81 | MC 2 | |
| ✎ ✕ | Personal | 05/27/2005 | Test | $ 4.81 | MC 2 | |

Done            Local intranet

METHODS AND SYSTEMS FOR EXPENSE MANAGEMENT

CROSS-REFERENCE TO RELATED APPLICATIONS

This application is a continuation of U.S. application Ser. No. 15/671,770 filed Aug. 8, 2017, which is a continuation of U.S. patent application Ser. No. 13/117,303 filed May 27, 2011, which is a continuation of U.S. patent application Ser. No. 11/159,398, filed Jun. 23, 2005, which claims priority from U.S. Provisional Application Ser. No. 60/581,766, filed Jun. 23, 2004. The entirety of the foregoing applications are incorporated herein by reference.

FIELD OF THE INVENTION

The present invention relates to the field of expense reporting.

DESCRIPTION OF EMBODIMENTS OF THE INVENTION

Figure 1:
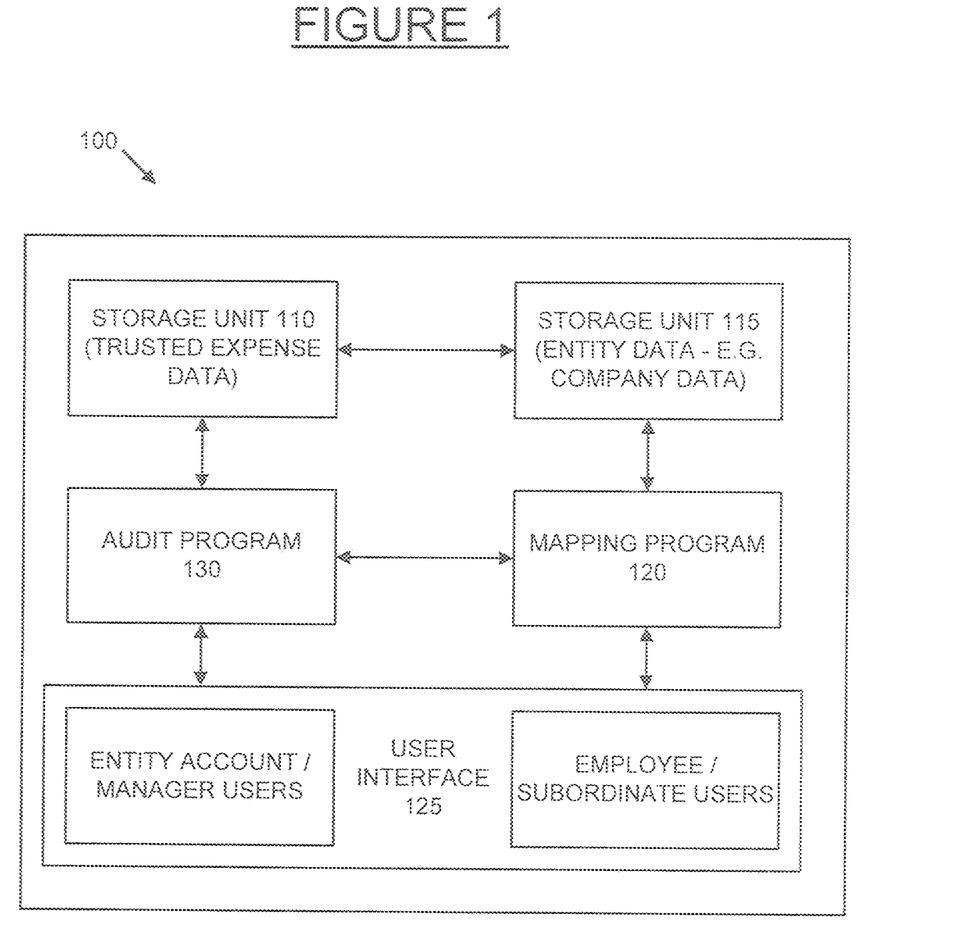
FIG. 1 illustrates the primary components of a representative operating environment, according to one embodiment of the present invention.

FIG. 1 illustrates an expense management system 100, according to one embodiment of the present invention. Expense management system 100 imports trusted itemized data and maps the data to defined expense types. The expense management system 100 comprises: storage units 110 and 115; a mapping program 120; an audit program 130; and a user interface 125.

FIG. 1 depicts storage units 110 and 115. However, these storage units are combinable in other embodiments. Storage unit 110 contains trusted itemized expense data, which is transmitted or obtained from any trusted source (e.g., credit card companies or any vendor that provides receipts in an electronic form). It should be noted that either all of the expense data or just a portion of the expense data can be itemized. Expense data can come in a form that identifies the location of the purchase, the amount of the total transaction, the amount and written description of the itemized sub-transactions, and a system-specific code which also describes or categorizes the sub-transactions. Storage unit 110 stores a master expense type list containing the complete domain of possible expense types utilized in expense management system 100. Expense types are associated with an identifier, a description, a general ledger or other accounting code, a list of data fields to be supplied on the expense report, or corporate policy information, or any combination thereof.

Company specific data to be utilized by expense management system 100 is stored in storage unit 115. Companies can select a sub-domain from the domain of the master expense type list. This sub-domain is typically derived from company needs in relation to control or accounting polices, or tax considerations. For additional mapping purposes, other codes or identifiers can be attached to the expense types in the sub-domain to facilitate various company functions. For example, an accounting code or identifier can be assigned to an expense type to allow the expense report to be imported into other company reports. Storage unit 115 also stores expense reports after and during processing by mapping program 120.

Mapping program 120 maps the trusted itemized expense data, stored in storage unit 110, to the domain of expense types selected by a company using expense management system 100. Prior to mapping expense data, the program correlates vendor expense codes to company-selected expense types. The correlation can match any number of expense codes to any number of expense types, and the program is customizable to incorporate corporate policies, desires and/or tax considerations. To perform the mapping operation, the expense codes assigned to the expense data can be read from the trusted source, or a vendor (e.g., hotel or rental car company), for each expense, itemized or not, and then the correlated expense types are assigned to each expense.

To facilitate mapping accuracy, one embodiment utilizes a filtering system that searches for key words in the trusted data (e.g., the filter searches expense descriptions in the trusted data for the key word "Internet" because some vendors use the same numerical expense code for telephone and Internet charges). The filter is customizable to cater to the weaknesses or idiosyncrasies of each trusted source or vendor, which in turn can improve overall system performance when more than one trusted source is providing expense data.

In one embodiment, the user interface 125 allows for at least two types of users. (However, in another embodiment, only one type of user can also be used in user interface 125.) First, company accountants/managers ("managers") provide expense management system 100 with company-specific information, which is then stored in storage unit 115. As discussed supra, managers can pick expense types from the master list of expense types to utilize, which when selected constitute the domain of expense types available to expense management system 100 for mapping purposes. Also, managers can assign additional data to the expense types to facilitate other company specific functions (e.g., company specific accounting codes can be assigned to the expense types to facilitate importing mapped expense data to other company systems). Managers also interact with expense management unit system 100 through auditing program 130.

Second, employees or travelers (e.g., those receiving the goods listed in the itemized expense data) primarily interface with expense management system 100 by editing and approving the mapped expense data, which is used to generate the final approved expense report. Additionally, expense management system 100 is customizable to allow employees to manually change the expense type assigned to imported expense data, or to allow employees to manually enter in expense data that was not or could not be imported by expense management system 100 though the trusted source.

In one embodiment, an audit program 130 allows managers to control and approve corrections made by employees to the mapped expense data. When an employee makes a change to the mapped expense data (e.g., by assigning the itemized expense data to a different expense types or correcting a line item amount), the change is flagged for auditing. This flagging process can happen in a number of ways with similar results. In one embodiment, to identify the changed mapping or transaction amounts, expense management system 100 will save a copy of the original mapped expense data and compare it with user-changed data. Thus, changes made outside the automated mapping process provided by expense management system 100 are scrutinized ensuring greater accuracy and preventing fraud. Auditing program 130 is customizable (e.g., programmed with tolerances or filters) to enable the system to only flag changes that meet (or do not meet) selected criterion (e.g., changes that are greater than a certain percentage or that map expense line items to the "personal" expense type will automatically be approved).

Figure 2:
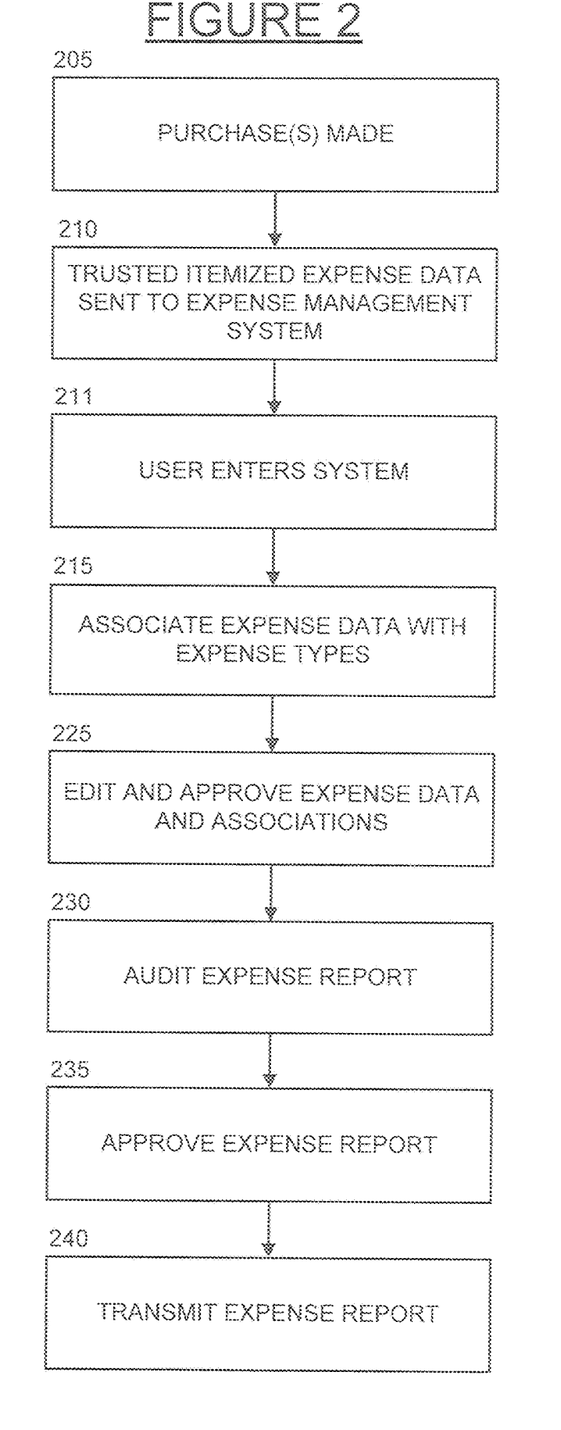
FIG. 2 illustrates a method of expense management, according to one embodiment of the present invention.

FIG. 2 illustrates a method of expense management, according to one embodiment of the present invention. FIG. 2 is explained in the context of purchases made with a hotel or car rental company. These examples in no way limit the applicability of the novel systems and methods disclosed herein.

In step 205, purchase(s) are made by an individual or entity (e.g., employee, traveler), who will eventually be responsible to submit an expense report accounting for the purchase(s). Although any individual or entity can be used in the example embodiment of FIG. 2, an employee will be used for demonstration purposes. Those skilled in the art will recognize that any individual or entity can use the present invention.

In one embodiment, the employee charges various expenses to a company credit card. In a hotel example, an employee purchases lodging, personal telephone calls, business telephone calls, mini-bar items, room service, meals at the hotel restaurant, Internet use, valet service, etc. The hotel purchases are made with a company assigned credit card, which is issued by a credit card company that has an agreement with the hotel to provide trusted itemized expense data.

Those skilled in the art will recognize that there are other methods of payment that could be used. The credit card vendors (e.g., MasterCard, Visa, American Express, Diners, etc.) provide data feeds to their customers containing information about all transactions involving the credit cards issued to the employees at their company. Those skilled in the art will recognize that there are other sources for data feeds, including the merchants themselves. The data feeds are typically electronic text files. The degree of detail contained may vary by data feed, as the credit card vendors typically have different data feed products and products with more detail may cost more to obtain. Within a given electronic text file, the level of detail may vary from transaction to transaction as not all merchants provide the same level of detail to the credit card vendors about purchases made by travelers. In one embodiment, certain data feed products would include hotel portfolio data (i.e., line-item detail breaking down the individual expenses on hotel receipts), referred to as sub-transactions, from hotel merchants who choose to participate in the providing such detail. It should be noted that expense management system 100 is still operative if only some, or even none, of the expense data is broken into sub-transactions. Those skilled in the art will understand that the exact format of the electronic text files may vary and that there are many other possible methods of transmission.

In step 210, the trusted itemized expense data is sent to expense management system 100. In one embodiment, the expense management system 10 imports electronic text with transaction data and analyzes it to identify the employees who charged each of the transactions. Thus, after the employee's trip is over, the employer receives an electronic data stream of the expense data (some of which has been broken into sub-transactions), which is then fed into expense management system 100.

Figure 3:
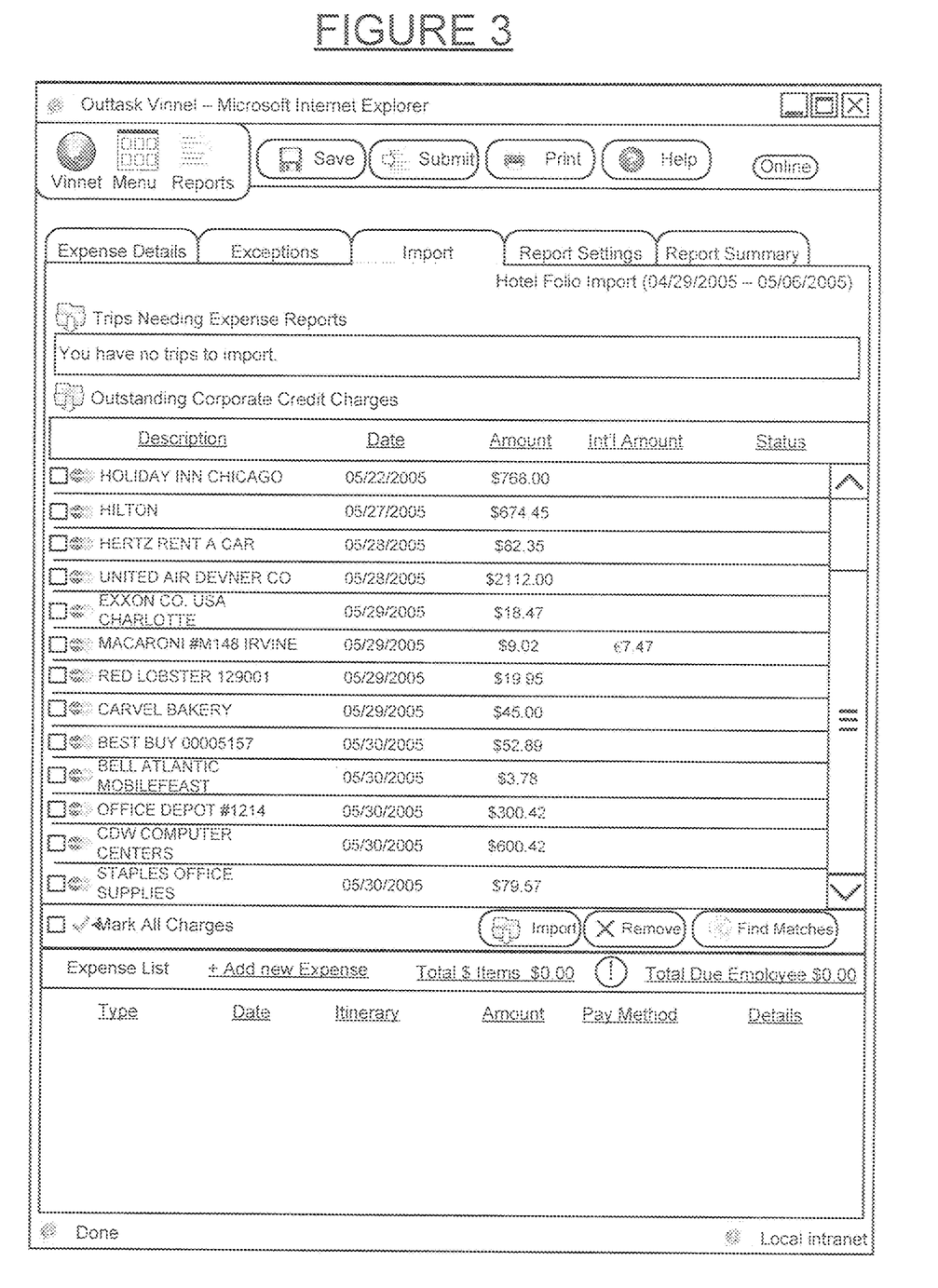
FIGS. 3-6 are exemplary screen shots, according to one embodiment of the present invention.
Figure 4:
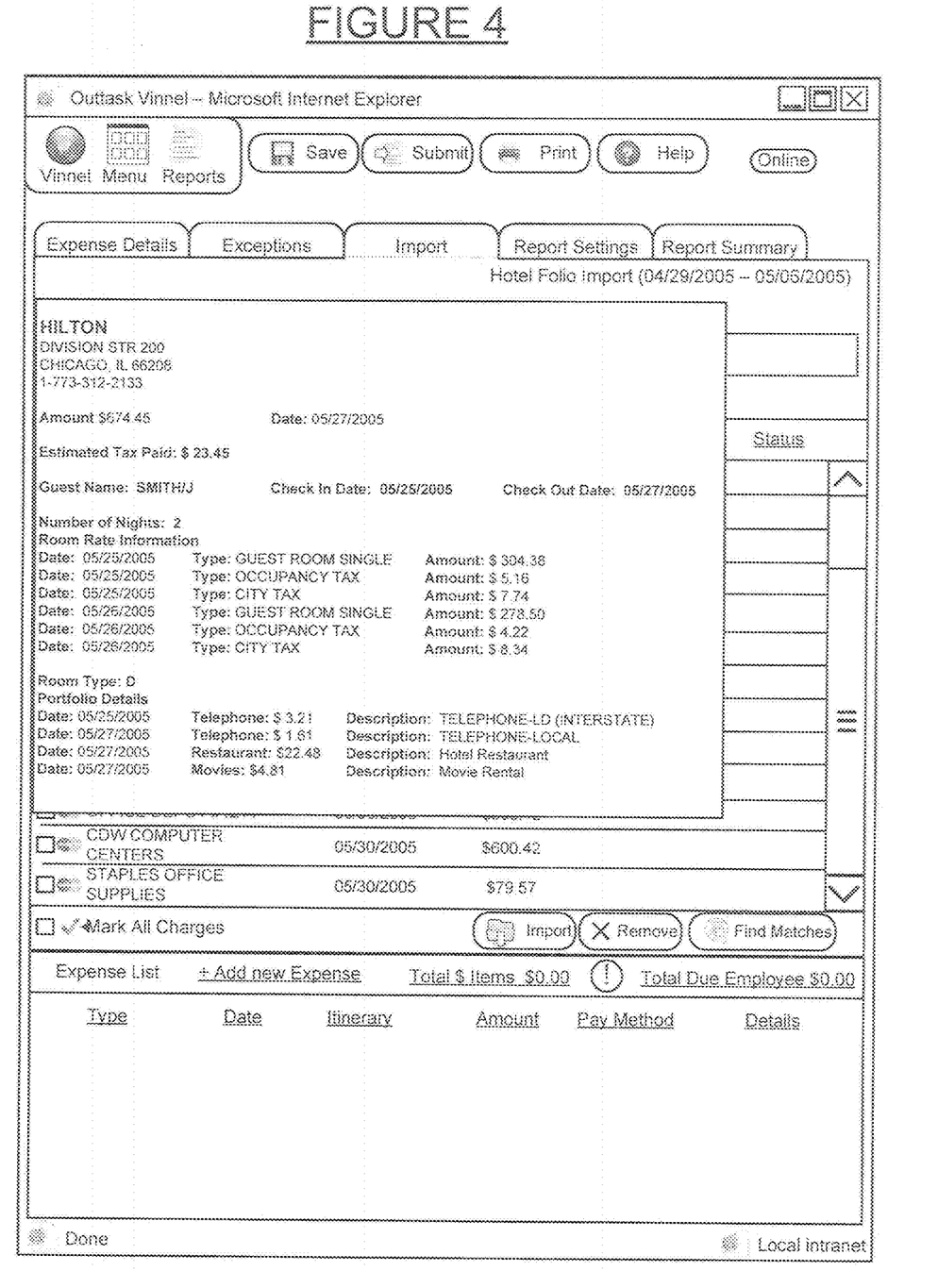

In step 211, at some point in the process, the employee gains access to the system and sees a list of corporate card charges ready to be imported. For example, the employee could see a list of charges on his corporate credit card, some of which are from hotels that have an agreement to provide sub-transaction data to the company through the corporate credit card. FIG. 3 is an example screen shot illustrating credit card data, according to one embodiment of the invention. The user can review sub-transaction data from hotels or other sources that have agreed to provide such data. In one embodiment, the user can place his mouse icon over such charges in order to see the sub-transactions (line items). In the hotel example, these sub-transactions should match the receipt that the user received upon check-out from the hotel. FIG. 4 illustrates an example of such sub-transaction data, according to one embodiment of the invention.

It should be noted that, in one embodiment, step 211 is optional, and the expense report may be automatically generated. For example, expense reports could be automatically generated on a periodic basis from corporate card data because a certain entity had many employees without Internet access.

It should also be noted that expense reports serve multiple purposes including, but not limited to, allowing the employee to be reimbursed for approved out-of-pocket expenses incurred during business travel. Expense management tools often include the capability of automatically paying credit card bills for company-issued credit cards. Employees are also often liable for expenses charged to these company-issued credit cards that are not approved by the employer or not authorized by company procedure. Thus, employees often include expenses from company-issued credit cards in their expense reports to obtain the required approval and to automate payment.

Figure 6:
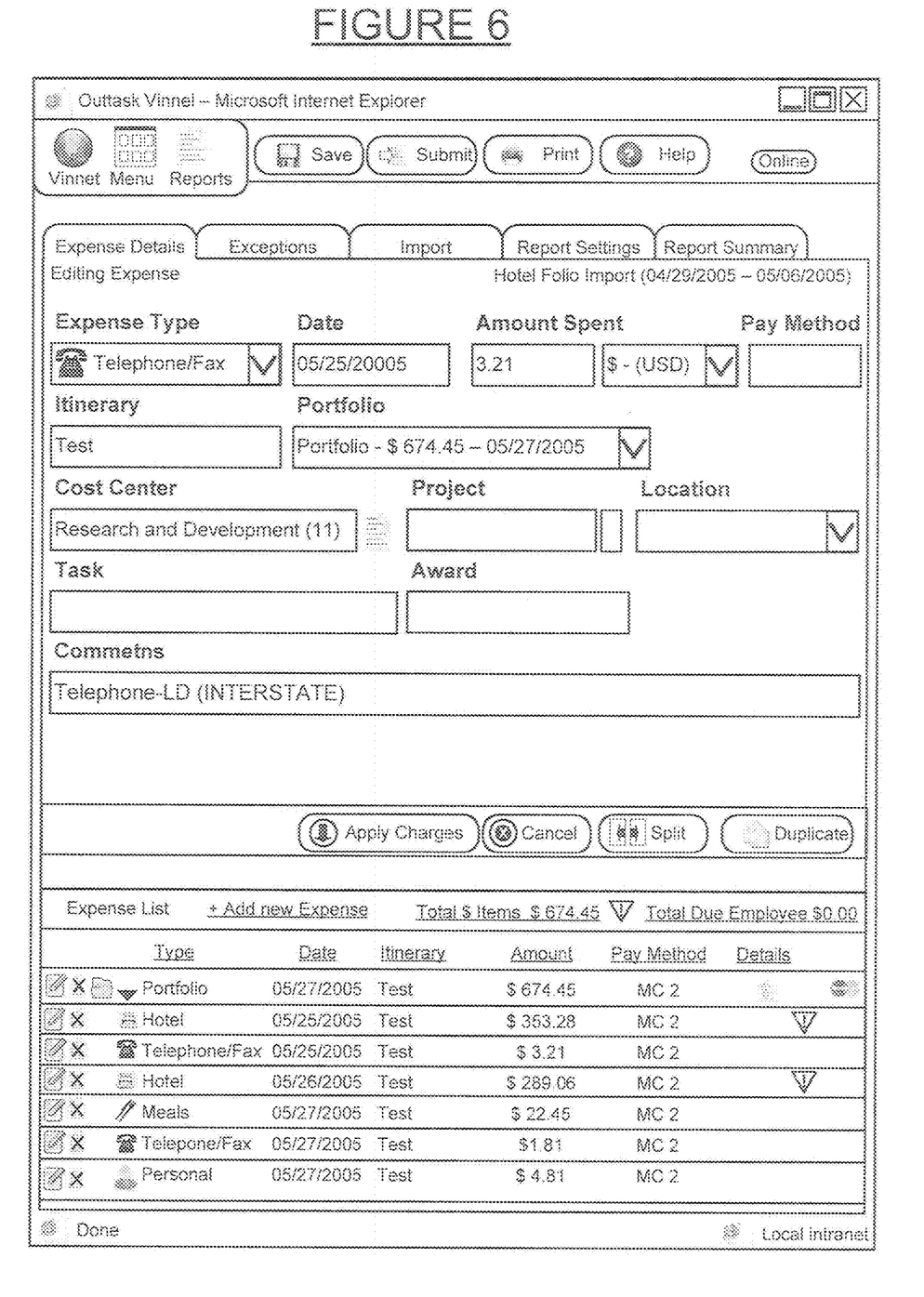

In step 215, expense management system 100 reads the expense codes in the expense data and maps all possible line items to their appropriate expense types. In step 211, the employee has imported charges that need to be reimbursed for a particular expense report. As shown in FIG. 6, in importing charges with sub-transaction data, such as a hotel charge, the charge comes into the expense report already broken down. With a hotel example, the hotel room comes in designated as a hotel expense, the two phone calls come in designated as telephone/fax, the restaurant comes in designated as a meal, and the movie (which is not reimbursable under company policy), comes in designated as personal. This procedure has saved time for the employee and increased accuracy, as people often either mis-key their receipt entry, or choose not to include certain itemizations because it is too time-consuming. These decisions can be detrimental to a company. For example, a company may not be able to fully take deductions for certain items (e.g., meals) that are taxed as a beneficial rate.

Note that in setting up expense management system 100, the company has selected expense types to utilize (e.g., based on internal controls and policies, tax requirements). For example, the line item for the lodging expense is assigned the expense code "395," which correlates to the expense type "travel-lodging," which is one of the expense types the company using expense management system 100 selected from the master expense type list.

In the rental car example, the rental car company charges the employee for the daily rental car rate, insurance, over mileage fee, refueling, etc. Instead of using a credit card to record and transmit the expense data 210, as illustrated in the hotel example, the rental car company has an arrangement with the employer (or a service that manages expenses for the employer) to send expense data directly to them in the form of trusted receipts. Is should be noted that almost all vendors, not just rental car companies or hotels, have the potential to provide electronic trusted receipts. Although the data from these receipts are different from that of the trusted expense data feeds from the credit card companies, expense management system 100 can still process this trusted receipts in a similar way—mapping the itemized expenses to appropriate expense types.

In one embodiment, expense management system 100 maintains a master list of expense types. Company accountants or managers choose from this list of expense types when creating a domain of expense types that will be used by the company or a department in the company. Those skilled in the art will recognize that an expense management system could contain multiple master lists of expense types, and that different groups of users within a company could use different lists. When expense items are imported the expense management system chooses the expense type based on semantic information added to each expense type on the master list. This semantic type information could be an integer code.

In one embodiment, semantic information can be added to all expense types. In other embodiments, semantic information can be added to only a subset of expense types, or no expense types at all. The user can determine which embodiment best fits the user's needs. For example, if the user has an expense in their system for "equipment repair", this is not an expense type that is returned by any of the hotel providers, so it would never get a hotel semantic term. However, if the trusted source, such as a rental car provider, does have the expense type "equipment repair", then this expense would get a rental car provider semantic term.

Those skilled in the art will recognize that there are many methods for storing semantic information. The semantic information provides a mapping between the possible list of types for the sub-transactions and the expense types in the expense management system. For example, the semantic information could indicate which expense type is to be used when importing a telephone charge, or an in-room movie. When a sub-transaction is imported, the type information from that sub-transaction is cross-referenced with the list of expense types to try to find an expense type with semantic information indicating that it is the correct type to use for this type of sub-transaction. If a match is found then the line item is imported with this type. For example, an Internet charge could be designated by the hotel as a phone charge expense type. However, a semantic search of the sub-transaction would reveal the word Internet to show that the Internet charge was for the Internet and not the phone.

Figure 5:
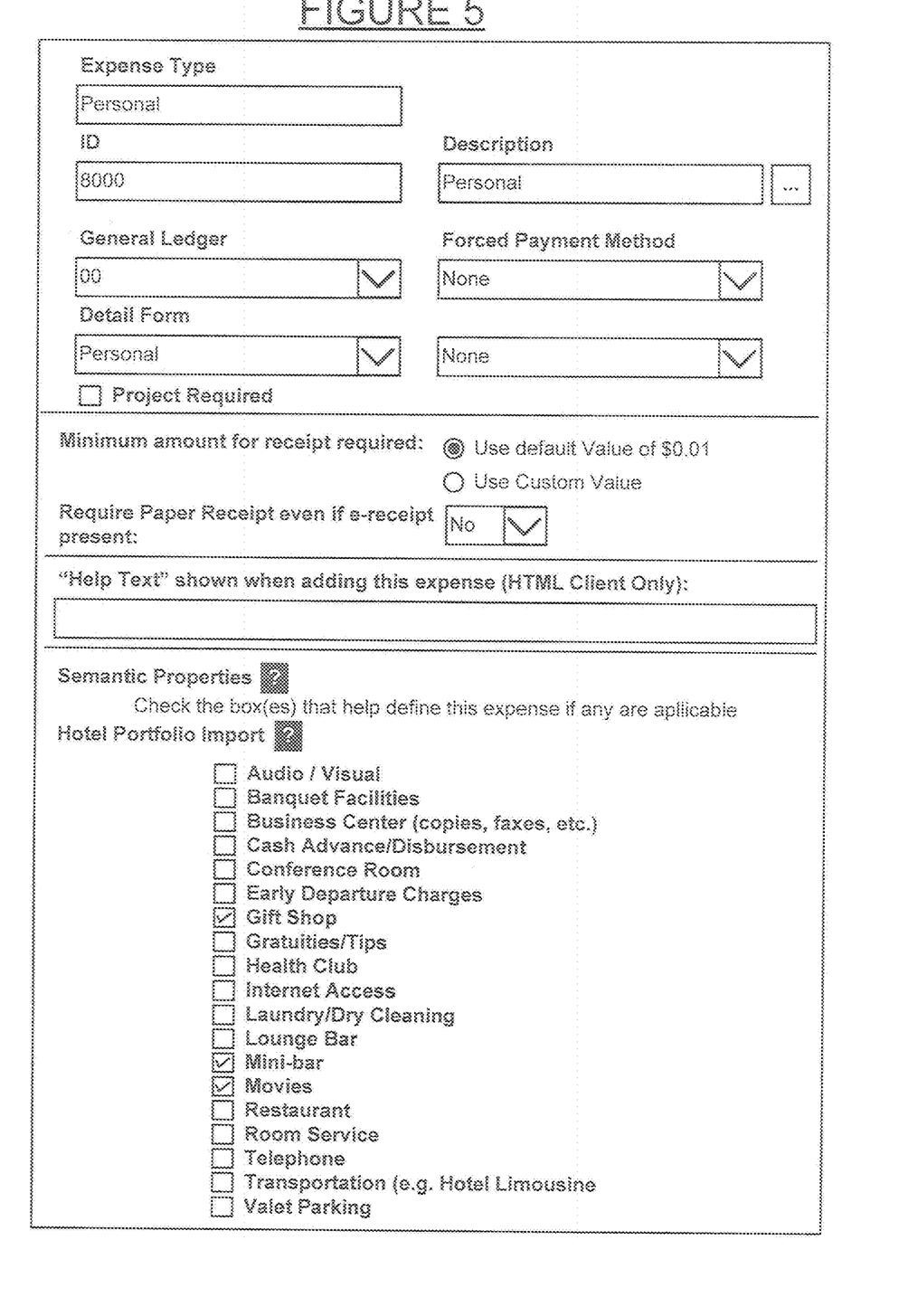

FIG. 5 is an exemplary screen shot illustrating how expense types are associated with semantics, according to one embodiment of the invention. The expense type is "personal". The semantics associated with personal expenses include gift shop, mini-bar, and movies, according to this particular company's policies.

In a further embodiment, the expense management system maintains a master list of accounting codes, including but not necessarily limited to cost centers, general ledger codes, and project codes. End users may choose from this list of accounting codes when creating expenses. The system may be configured to restrict the codes that a given user may use. Those skilled in the art will recognize that perhaps no codes are used for a given expense, but on other expenses multiple codes may be necessary. When an expense transaction is imported and the expense management system detects that this transaction has been assigned to multiple accounting codes, the accounting code information stored on the sub-transactions can be read and then used to choose the values for the corresponding expense items on the expense report. The billing codes include, but are not limited to, cost centers (e.g., marketing department), a project (e.g., a particular matter), and an identifier that maps to a classification used in a company's accounting system (e.g., an air ticket may be designated differently from lodging for tax purposes).

In step 225, the employee is able to edit and approve the expense data and mapping. If an expense is mapped to more than one expense type, then the employee can select the appropriate type from the available options. If no expense type or the wrong type is assigned, then the employee can change the assigned expense type. For example, when the employee reviews the mapped hotel expense data, he or she realizes that the personal telephone calls have been included with the business telephone expense and mapped to the "travel-phone" expense type. To correct the error, the employee is able to edit this expense and parse the business from the personal calls and, in addition, the employee maps the personal telephone calls to the "personal" expense type. When the employee has reviewed all the expenses and assigned expense types where needed, the employee can approve, or sign off on, the mapped data.

In step 230, expense management system 100 is optionally able to audit the expense report. Expense management system 100 contains an audit module that can automatically compare the original transactions and sub-transactions from the data feed with the expenses actually submitted to detect differences between the two. For example, if a hotel receipt contained $100 for a room, $50 for meals and $10 for an in-room movie, but the expense report contains $100 for the room and $60 for meals, the audit module would detect this. Those skilled in the art will recognize that there are many ways to implement such an audit module including, but not limited to, a database query that compares relational database entries containing the expense reports and the original transactions and sub-transactions. Those skilled in the art will recognize that there are many ways to present the information regarding the expense reports which deviate from the data feed, such as in tabular format on-screen or in a spreadsheet file which can be read by an application such as Microsoft Excel.

In one embodiment, the audit module can be configured to have tolerances or filters, which can automatically approve a difference between the expense report and the imported data because the difference meets the programmed criteria. A zero-tolerance program would present all reports that differ by any amount, whereas a 1 percent tolerance would present reports where the difference is greater than 1 percent. Those skilled in the art will recognize that tolerances or filters can be presented in forms other than percentages.

When an employee changes an expense amount or mapping, expense management system 100 flags this change for auditing. This flagging can be performed in several ways, as one skilled in the art will recognize. One embodiment, for example, saves the original imported trusted expense data and compares this with the data approved by the employee submitting the expense report and expense management system 100 notes, or flags, all discrepancies. Additionally, according to company controls, certain expense types or charges can be flagged for auditing, even if a change has not been made to the line item (e.g., if company policies forbid reimbursement for mini-bar or valet charges, then every time these expenses appear, they can be flagged for auditing). Expense management system 100 can perform the auditing function either manually or automatically through a programmed filter or tolerance, or through a combination or both. For example, expense management system 100 can be programmed to automatically approve all changes that are mapped to the "personal" expense type.

In step 235, after the report has been sufficiently audited (if this feature is used), then it becomes an approved expense report. In step 240, the approved expense report is used in myriad accounting and company functions.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments. In particular, it should be noted that, for example purposes, the above explanation has focused on the example of a hotel charge. However, those experienced in the art will realize that any charge with sub-transactions (e.g., a rental car charge) can be used.

In addition, it should be understood that the figures and screen shots, which highlight the functionality and advantages of the present invention, are presented for example purposes only. The architecture of the present invention is sufficiently flexible and configurable, such that it may be utilized in ways other than that shown in the accompanying figures. For example, the steps in the flowchart can be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

The invention claimed is:

1. A computerized method for expense management of expenses, comprising:
   receiving, by a computing device via at least one network, an electronic feed of charges associated with an expense receipt record originating from a vendor, the electronic feed of charges including computer-readable electronic transaction data;
   automatically detecting, by the computing device, that the expense receipt record from the electronic feed of charges is comprised of two or more line items;
   automatically mapping, by the computing device, each of the two or more line items to respective expense types, the mapping utilizing vendor expense codes or keyword searches; and
   automatically pre-populating, by the computing device, the respective expense types mapped to each of the two or more line items from the expense receipt record in an expense report in an expense management system as two or more expense itemizations.

2. The method of claim 1, wherein the expense report shows the two or more line items associated with the respective expense types.

3. The method of claim 1, further comprising:
   providing the expense report for approval;
   providing the expense report for reimbursement; or
   providing the expense report so that it can be integrated with other documents; or
   any combination thereof.

4. The method of claim 1, further comprising:
   allowing at least one user to edit the expense report; or
   allowing at least one user to approve the expense report; or any combination thereof.

5. The method of claim 1, wherein the vendor comprises:
   at least one hotel entity;
   at least one car rental entity; or both.

6. The method of claim 1, wherein the respective expense types comprises: at least one lodging room rental, at least one tax, internet access, at least one telephone call, food and/or beverage from at least one eating establishment, at least one item from at least one mini-bar, at least one service from at least one business center, room service, gym or health club access, an item from at least one hotel store, banquet facility rental at least one gratuity, laundry service, parking, limousine service, at least one movie, audio and/or video equipment rental, at least one cash advance, at least one conference room rental, or at least one early departure fee, or any combination thereof.

7. The method of claim 1, wherein the respective expense types comprises: at least one automobile rental, insurance, fuel, extra mileage, or equipment repair, or any combination thereof.

8. A non-transitory machine-readable medium storing a program executable by at least one processing unit of a device, the program comprising a set of instructions for:
   receiving, by a computing device via at least one network, an electronic feed of charges associated with an expense receipt record originating from a vendor, the electronic feed of charges including computer-readable electronic transaction data;
   automatically detecting, by the computing device, that the expense receipt record from the electronic feed of charges is comprised of two or more line items;
   automatically mapping, by the computing device, each of the two or more line items to respective expense types, the mapping utilizing vendor expense codes or keyword searches; and
   automatically pre-populating, by the computing device, the respective expense types mapped to each of the two or more line items from the expense receipt record in an expense report in an expense management system as two or more expense itemizations.

9. The non-transitory machine-readable medium of claim 8, wherein the expense report shows the two or more line items associated with the respective expense types.

10. The non-transitory machine-readable medium of claim 8, wherein the set of instructions further comprises instructions for:
    providing the expense report for approval;
    providing the expense report for reimbursement; or
    providing the expense report so that it can be integrated with other documents; or
    any combination thereof.

11. The non-transitory machine-readable medium of claim 8, wherein the set of instructions further comprises instructions for:
    allowing at least one user to edit the expense report; or
    allowing at least one user to approve the expense report; or any combination thereof.

12. The non-transitory machine-readable medium of claim 8, wherein the vendor comprises:
   at least one hotel entity;
   at least one car rental entity; or both.

13. The non-transitory machine-readable medium of claim 8, wherein the respective expense types comprises: at least one lodging room rental, at least one tax, internet access, at least one telephone call, food and/or beverage from at least one eating establishment, at least one item from at least one mini-bar, at least one service from at least one business center, room service, gym or health club access, an item from at least one hotel store, banquet facility rental at least one gratuity, laundry service, parking, limousine service, at least one movie, audio and/or video equipment rental, at least one cash advance, at least one conference room rental, or at least one early departure fee, or any combination thereof.

14. The non-transitory machine-readable medium of claim 8, wherein the respective expense types comprises: at least one automobile rental, insurance, fuel, extra mileage, or equipment repair, or any combination thereof.

15. A system, comprising:
   one or more processors;
   a software program comprising instructions executable on said one or more processors, the software program configured for:
   receiving, by a computing device via at least one network, an electronic feed of charges associated with an expense receipt record originating from a vendor, the electronic feed of charges including computer-readable electronic transaction data;
   automatically detecting, by the computing device, that the expense receipt record from the electronic feed of charges is comprised of two or more line items;
   automatically mapping, by the computing device, each of the two or more line items to respective expense types, the mapping utilizing vendor expense codes or keyword searches; and
   automatically pre-populating, by the computing device, the respective expense types mapped to each of the two or more line items from the expense receipt record in an expense report in an expense management system as two or more expense itemizations.

16. The system of claim 15, wherein the expense report shows the two or more line items associated with the respective expense types.

17. The system of claim 15, wherein the software program is further configured for:
   providing the expense report for approval;
   providing the expense report for reimbursement; or
   providing the expense report so that it can be integrated with other documents; or
   any combination thereof.

18. The system of claim 15, wherein the software program is further configured for:
   allowing at least one user to edit the expense report; or
   allowing at least one user to approve the expense report; or any combination thereof.

19. The system of claim 15, wherein the vendor comprises:
   at least one hotel entity;
   at least one car rental entity; or both.

20. The system of claim 15, wherein the respective expense types comprise: at least one lodging room rental, at least one tax, internet access, at least one telephone call, food and/or beverage from at least one eating establishment, at least one item from at least one mini-bar, at least one service from at least one business center, room service, gym or health club access, an item from at least one hotel store, banquet facility rental at least one gratuity, laundry service, parking, limousine service, at least one movie, audio and/or video equipment rental, at least one cash advance, at least one conference room rental, or at least one early departure fee, at least one automobile rental, insurance, fuel, extra mileage, or equipment repair, or any combination thereof.

* * * * *